United States Patent [19]

Munsen et al.

[11] Patent Number: 4,606,961

[45] Date of Patent: Aug. 19, 1986

[54] DISCRETELY STIFFENED COMPOSITE PANEL

[75] Inventors: Victor A. Munsen, Seattle; John P. Ruane, Auburn, both of Wash.

[73] Assignee: The Boeing Company, Seattle, Wash.

[21] Appl. No.: 659,076

[22] Filed: Oct. 9, 1984

[51] Int. Cl.$^4$ ............................................. B32B 7/00
[52] U.S. Cl. ...................................... 428/119; 428/105; 428/109; 428/113; 428/120; 428/284; 428/408; 428/902; 428/192
[58] Field of Search ............... 428/61, 105, 113, 109, 428/119, 120, 284, 408, 902, 192

[56] References Cited

U.S. PATENT DOCUMENTS 4,328,272 5/1982 Maistre ............................. 428/119
4,469,730 9/1984 Burhans ............................ 428/408

Primary Examiner—James J. Bell
Attorney, Agent, or Firm—Christensen, O'Connor, Johnson & Kindness

[57] ABSTRACT

A discretely stiffened composite panel formed of multiple layers of cured fibrous material. The panel (46) includes a planar part (38) and a plurality of stringers (36) located in spaced apart positions across the width of the planar part. The stringers terminate before reaching the edge of the planar part of the panel. The panel includes groups of interspersed strips of fibrous material (60, 61) having load bearing characteristics most favorable to carrying the primary axial loading (P) applied to the panel. The strips underlie the stringers and extend beyond the stringers to the edge of the planar part of the panel. The regions between the strips are filled with filler layers (64, 65). The use of groups of strips (60, 61) and filler layers located at the edge of the panel provides a panel having a reinforced, constant thickness edge having improved damage containment characteristics that is easily spliced with no significant loss of strength on the splice area.

7 Claims, 13 Drawing Figures

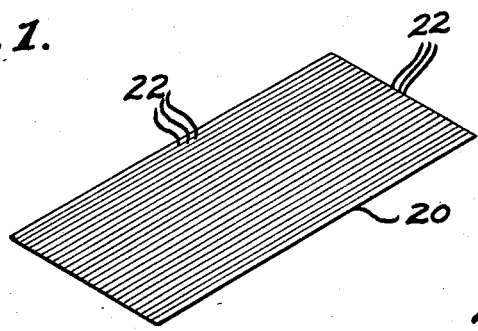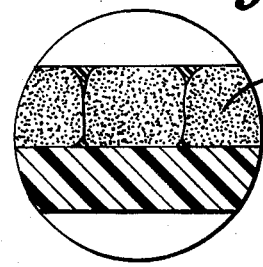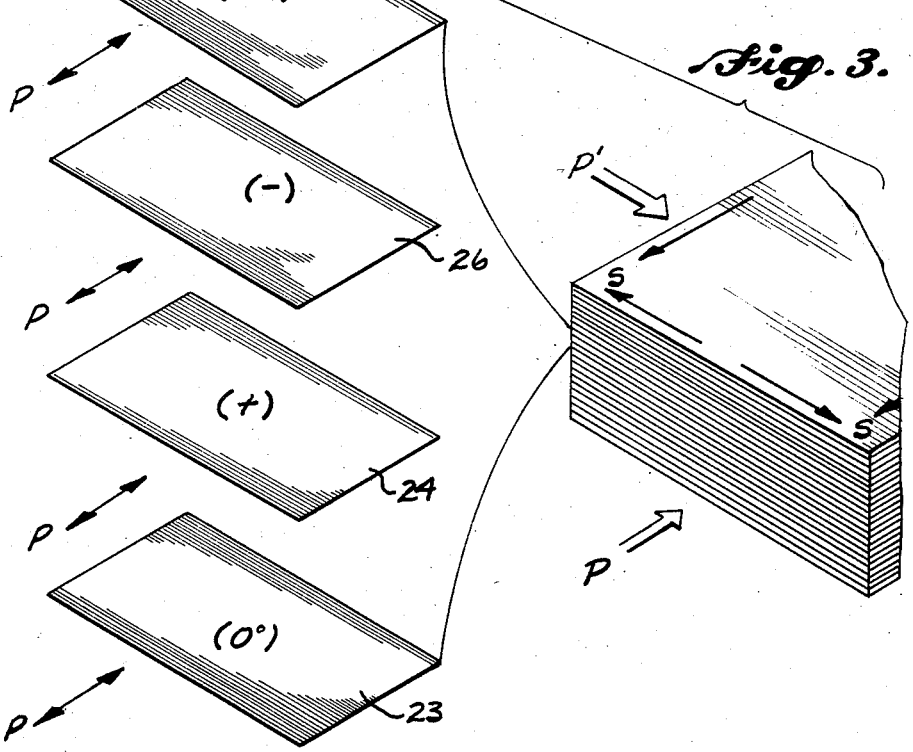

REFERENCE AXIS

ORIENTATION SYMBOLS

58 = BASE LAYERS   64 = ADDITIONAL FILLER LAYERS
60 = STIFFENER ENHANCEMENT STRIPS
61 = SPLICE EDGE STRIPS   65 = FILLER LAYERS

4,606,961

DISCRETELY STIFFENED COMPOSITE PANEL

TECHNICAL AREA

This invention relates to discretely stiffened panels fabricated from composite materials comprising high-strength fibers, such as graphite, embedded in a resin matrix; more particularly, this invention relates to the splicing of such panels.

BACKGROUND OF THE INVENTION

Many planar composite panels are formed with a number of discrete stiffener members or "stringers" affixed to, or integrally formed with, one side of the panel. Frequently, the stringers are formed of the same composite materials as the remainder of the panel. In any event, the stringers are constructed in such a manner and positioned to carry a high percentage of the axial loading that is applied to the panel when the panel is in use.

The use of discretely stiffened composite panels has become more widespread as the structural integrity of such panels has improved. One area in which the use of such panels is expanding is the jet aircraft field, particularly the commercial jet transport field. One impediment to the continued expansion of the use of stiffened composite panels in jet transport aircraft has been the difficulty associated with the end splicing of such panels in a structurally acceptable, yet inexpensive, manner.

In the past, it was thought that end-to-end splicing of discretely stiffened panels required the use of complex fastening devices. The fastening devices were complex because they were designed to splice the stiffener members, e.g., stringers, as well as the remainder of the panels. It was assumed that stiffener splicing was required so that the axial load bearing properties of the panels remained substantially unaffected across the splice section.

This invention provides discretely stiffened composite panels that can be spliced in a structurally acceptable manner with uncomplicated splicing devices. This invention further provides discretely stiffened composite panels wherein the composite material layers used to form the panels are sized and oriented to enhance the fast, cost effective, automatic fabrication of the panels.

SUMMARY OF THE INVENTION

In accordance with this invention, provided are discretely stiffened composite panels formed of a planar part and integrally formed elongate stringers, both of which are preferably formed of layers of collimated fiber elements entrained in a binder. The discretely stiffened composite panels include one or more splice edges that lie substantially transverse to at least some of the stringers. The splice edges are substantially thicker than the planar part and include additional layers of collimated fiber elements that are aligned with and underlie the stringers. The splice edges also include layers of collimated fiber elements that are oblique to the stringers and lie between them. The stringers terminate before reaching the end of the splice edges. Preferably, the cross-sectional area of the ends of the stringers is gradually reduced in the region where the planar parts flow into the thickened splice edges.

In accordance with further aspects of this invention, the splice edges include the layers that make up the planar part (e.g., base layers) plus stringer enhancement strips and splice edge strips. The base layers are positioned so that the direction of the entrained fibers of each layer vary between parallel, perpendicular and oblique with respect to the longitudinal direction of the stringers. The stringer enhancement strips underlie substantially the entire length of the stringers and are interspersed among the base layers. The stringer enhancement strips are oriented so that the direction of the entrained fibers lie parallel to the stringers. The splice edge strips also underlie the stringers [only in splice edges] and are interspersed among the base layers. The splice edge strips are also oriented so that the direction of entrained fibers lie parallel to the stringers. The regions between the stringer enhancement strips in the splice edges are filled with filler layers that have fiber directions that vary between perpendicular, oblique, and parallel with respect to the longitudinal direction of stiffener members—with a majority of the filler layers between the splice edge strips having fiber directions lying oblique to the stiffener members. The filler layers are positioned so that they underlie and extend between the stringers.

The particular placement of the stringer enhancement and splice edge strips results in a structural panel that has a splice edge that is discretely stiffened with respect to axial loads that are applied in the direction of the stringers. Furthermore, because the filler areas create a splice edge of uniform thickness, abutting splice edges can be joined with uncomplicated splicing devices (such as flat plates) without significantly diminishing the structural properties of the overall structure in the splice area.

BRIEF DESCRIPTION OF THE DRAWINGS

The foregoing and other advantages of this invention will become more readily appreciated as the same becomes better understood from the following detailed description when considered in combination with the accompanying drawings, wherein:

FIG. 1 is an isometric view of a standard composite material layer consisting of collimated or unidirection yarn formed of high-strength fibers embedded in a resin matrix;

FIG. 2 is an enlarged view of a part of one end of FIG. 1;

FIG. 3 is an isometric view of a portion of a composite structure that is formed by laying up multiple layers of fibrous material of varying fiber directions;

DESCRIPTION OF THE PREFERRED EMBODIMENT

The composite materials of interest with respect to the instant case consist of high-strength fibers embedded in a resin matrix. For example, one common type of composite material called "prepreg" comes in the form of strips or tape 20 formed of strands of yarn 22 that are entrained in an epoxy matrix as shown in FIGS. 1 and 2. The yarn is formed of high-strength fibers such as graphite, which are collimated and held in a planar juxtaposition by the matrix or binder material. The following description of the preferred embodiment of this invention contemplates creating a structural member fabricated from multiple layers of such composite tape laid up and then cured in a conventional manner.

Before proceeding further, it is important to recall and understand the anisotropic load bearing properties of composite materials. As noted above, the fibers that form the yarn that is embedded in the matrix are collimated, i.e., oriented in a single direction. While graphite and other fibers have substantial longitudinal compression and tension load bearing capacity in the fiber direction when embedded in a cured matrix, they have little strength in directions other than the fiber directions. Because currently known matrix materials per se have little load bearing capacity, strips or tapes formed in the manner described above only have the strength provided by the fibers. Since fiber strength is longitudinal compression and tension strength, tape strength is correspondingly longitudinal compression and tension strength.

Figure 4:
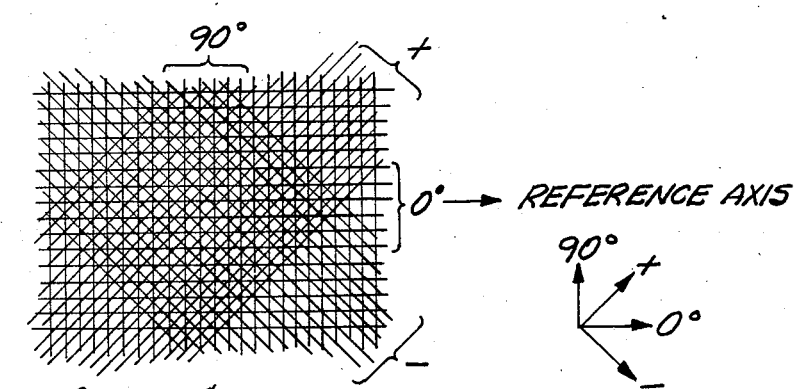
FIG. 4 illustrates the conventional method of labeling fibrous material layers according to the direction of entrained fibers.

For convenience of discussion, FIGS. 3 and 4 show the conventional scheme for labeling composite materials according to the direction of their entrained fibers. A layer of composite material 23 (FIG. 3) is designated as a "0°" layer. Normally a 0° layer term is based on the direction of the primary load, P, acting on the composite structure, i.e., the 0° layer's fibers are located parallel to the direction of the primary load, P. Three other directional designations are used in the following discussion. They are: "+", "90°" and "−". The symbol "+" indicates a layer of composite material 24 (FIG. 3) whose fiber direction is angled in a counterclockwise direction from the primary load direction. "90°" indicates a layer of composite material 25 (FIG. 3) whose fiber direction is perpendicular to the primary load direction. "−" indicates a layer 26 (FIG. 3) whose fiber direction is angled in a clockwise direction from the primary load direction. The layers with fibers angled clockwise and counterclockwise from the 0° direction are typically angled at 45° to the 0° direction but may be oriented at any angle advantageous to practitioners of the art.

The choice of the number of 0°, +, − or 90° layers needed to form any particular structure is based on the axial loading (P), biaxial loading (P and P') and shear loading (S) likely to be encountered by the structure. If, as above, P is used to designate the primary loading (in terms of magnitude) applied to a structure embodying this invention, the number of 0° layers needed to withstand the P load will be determined along with a determination of the additional number of "+", "90°" and "−" layers needed to withstand loads in other directions.

Figure 5:
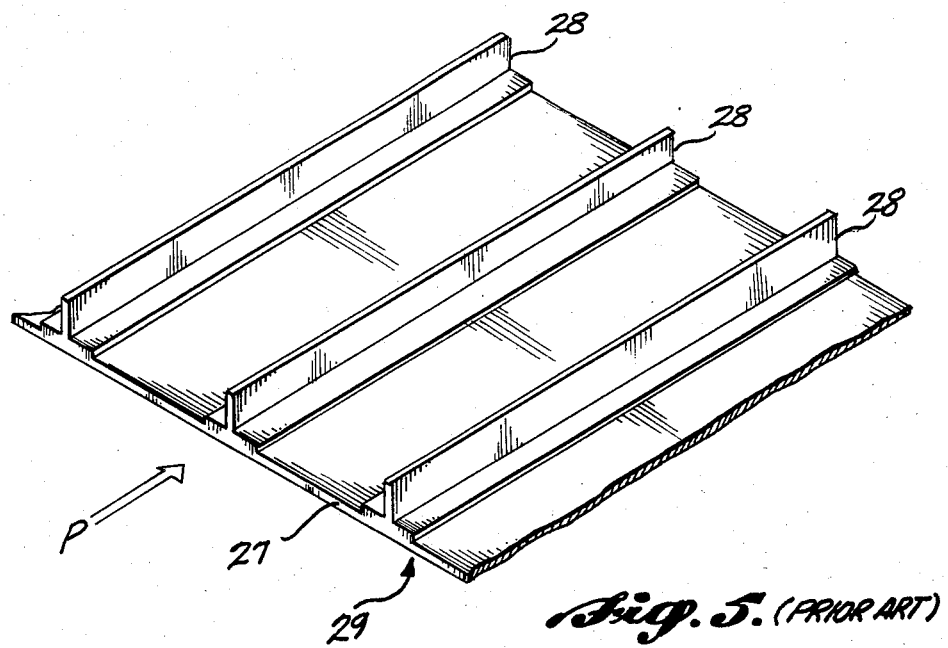
FIG. 5 is an isometric view of a prior art stiffened composite panel with stringer enhancement strips.

In order for the invention to be better understood, an understanding of the problems associated with the splicing of prior art panels is necessary. A typical prior art composite panel 29 is shown in FIG. 5. The panel includes a planar part 27 and parallel stringers 28 mounted on one side of the planar part. The planar part 27 and the stringers 28 are unitarily made from multiple layers of composite materials that have been laid up and cured for the requisite time at the requisite temperature, as is well known in the art. The panel is formed such that when it is positioned in a structure, for example an airplane wing, the stringers 28 are aligned with the primary axial load, P. As much as 80% of the primary axial load may be carried by the cross section of the stringers 28.

Figure 6:
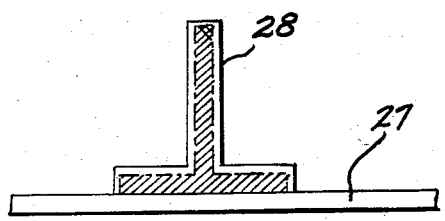
FIG. 6 is a schematic end view of part of the prior art panel of FIG. 5.

In order to effectively bear the high primary axial load, the axial stiffness of the composite panel is enhanced by fabricating the panel so that a high percentage of the layers of composite material that form the stringers are 0° layers, i.e, the fibers of the layers lie parallel to the direction of the primary axial load P. This is schematically illustrated in FIG. 6. More specifically, in FIG. 6, the crosshatched area indicates the portion of the structure containing a high percentage of 0° layers. The stringer 28 has few layers other than 0° layers since its main function is to carry the primary axial load. In the area of the panel between the stringers, the layers forming the planar part 27 are oriented to vary between 0°, +, −, or 90°. Unlike the stiffened area in the stringer, between the stringers normally there is no concentration of layers with fibers oriented in one particular direction.

A prior art composite panel formed in the manner described above is discretely stiffened by the 0° layers in the stringers 28 depicted by the crosshatching in FIG. 6. The areas between and under the stringers are "soft," with respect to stiffness. Prior art stiffened composite panels have some favorable damage containment capability that is not provided by other types of panels. Specifically, if a prior art stiffened panel is so heavily loaded in the primary direction that a fracture occurs, propagation of the fracture can be contained within the soft areas. In essence, the soft areas absorb the energy released by the fracture and the stringers increase the strength of the panel at discrete intervals to arrest fracture growth into adjacent soft areas.

This ability to arrest fracture growth in prior art panels is limited however, by the interlaminar shear strength of the matrix or binder material that lies between the stringers 28 and planar part 27.

Figure 5A:
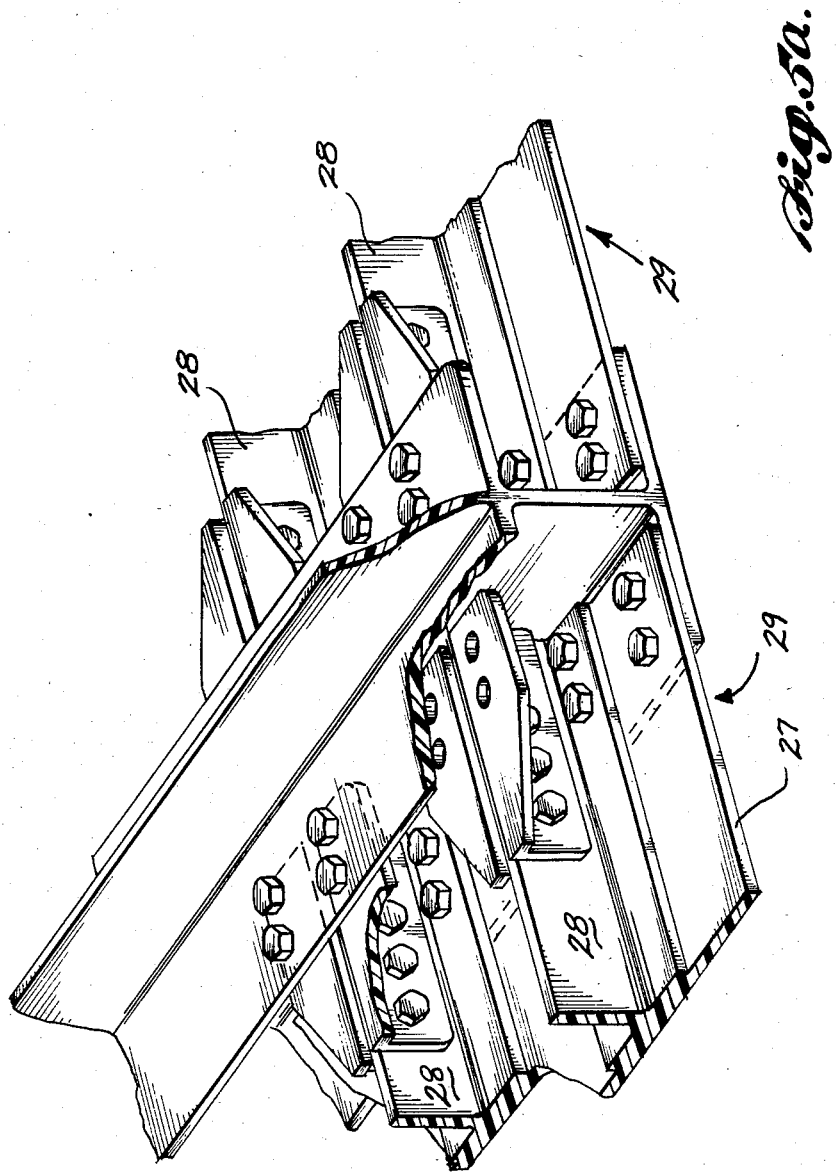
FIG. 5a is an isometric view of two prior art panels spliced together.

The high strength-to-weight ratio and other design considerations of prior art stiffened composite panels, makes them desirable for use in many environments, such as aircraft, including commercial transport aircraft. However, in order to make full use of such panels, it is necessary to be able to splice two abutting panels together without lowering the strength of the spliced panels. In the past, this has required that both the stringers 28 and the planar part 27 be joined. Because of the complicated end configuration of these items, complicated splicing devices such as shown in FIG. 5a have been required. This invention is directed to creating discretely stiffened composite panels with enhanced damage arrestment characteristics that can be joined by relatively uncomplicated splicing devices.

Figure 7:
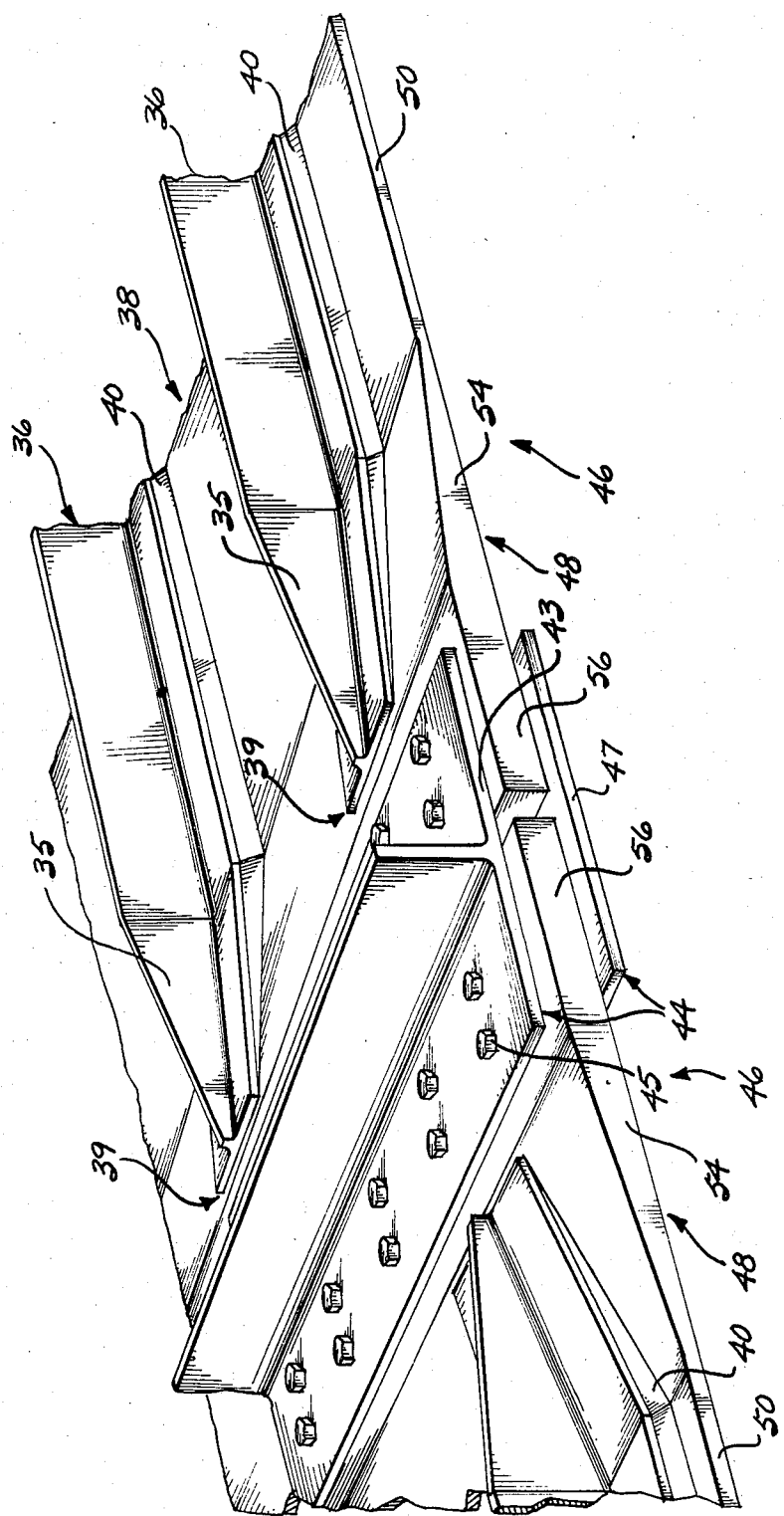
FIG. 7 is a partial isometric view of a pair of composite panels formed in accordance with the invention and spliced together.

A preferred embodiment of two panels formed in accordance with this invention and spliced together is shown in FIG. 7. As will be better understood from the following detailed discussion of discretely stiffened composite panels formed in accordance with the invention, the stringers 36 of such panels terminate before the outer region of splice edge 48 of the panel is reached. Correspondingly, the splice edge of the panel is thickened. The end result is a splice edge that is both structurally strong and easy to join to another panel. As shown in FIG. 7, two composite panels 46 can be abutted and spliced together using a simple splice 44 formed of a flat plate 47 and a T-bracket 43 fastened together by suitable fasteners such as shear bolts 45. More specifically, discretely stiffened composite panels formed in accordance with the invention comprise substantially flat planar parts 38, and a number of parallel stringers 36 located on one side of the planar part 38. The planar part consists of a central portion 50 that is essentially uniform in thickness except for built-up areas 40 located beneath the stringers 36. The nature of the built-up areas is discussed in detail below. The splice edge 48 comprises a tapered inner region 54 and a uniformly thick outer region 56. The central portion 50, along with the splice edge 48, are all formed of multiple layers of composite material laid up and cured together to form one continuous structural element. The exact orientation of the composite material layers is discussed in detail below.

The stringers 36 are also formed of layers of composite material. While the shape of the stringers illustrated in the drawing is that of an inverted "T", it is to be understood that the stringers can have other shapes—an "I" for example—depending on the load bearing direction and capacity required. The stringers 36 terminate prior to reaching the inward edge of the outer region 56 of splice edge 48. The webs 35 of stringers 36 taper from full height to a nominal height, beginning proximate to the junction of the central portion 50 and the tapered inner part of the splice edge 48. Height reduction may be accomplished by trimming the final cured web 35 with any appropriate cutting means. In any event, the stringers taper in one direction as the tapered inner part of the splice edge tapers in the other direction.

As noted above, the edges of composite panels formed in accordance with the invention that are to be spliced together are flat and have a uniform thickness across the width of the panel. Because the edges are so formed, they can be easily and quickly attached with a simply configured splice. As shown in FIG. 7, the splice 44 may be a "T chord" type splice having a T-shaped first part 43 and a flat second part 47. The flanges of the first part 43 and the second part 47 span across two abutting outer regions 56 of the splice edges 48. Shear bolts 45 passing through the flanges and the splice edges fasten the panels together.

It can be appreciated that because the stringers 36 terminate before reaching the outer region of the splice edges, the stringers provide no load carrying capability in this region. Thus, without a way of compensating for this loss, even a composite panel with thick splice edges, as illustrated in FIG. 7, would have diminished damage containment properties and be seriously weakened at the splice regions. More specifically, while relatively thick splice edges 48 of random layer orientation would be stronger than the central portion 50, the splice edge would be weaker in the primary load direction P due to the loss of the stringer. In accordance with the invention, this problem is avoided by combining layers of composite material in a way that extends the stringer strength into the thick splice edges without requiring that the stringers per se extend to the edge of the overall panel. The end result is a structurally acceptable panel that is easily spliced to another panel (or some other element).

Figure 8:
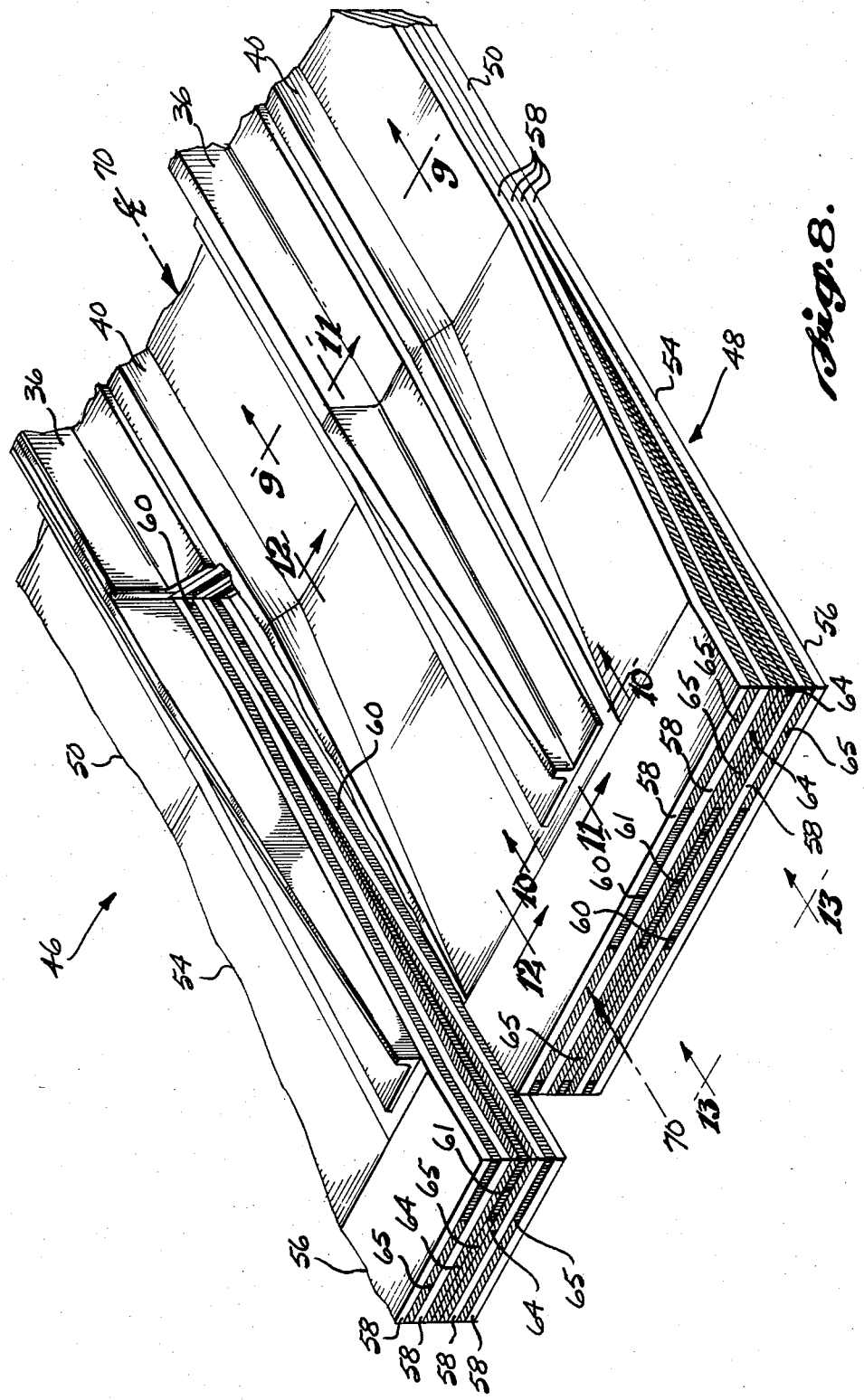
FIG. 8 is a schematized illustration of the significant groups of fibrous material layers that make up a preferred embodiment of a composite panel formed in accordance with the invention.

Prior to discussing an actual layup formed in accordance with the invention, the schematized drawing of FIG. 8 is described. FIG. 8 shows a portion of the composite panel 46 cut away to expose the significant groups of fibrous material layers that make up the panel. The groups or blocks of layers shown in FIG. 8 do not represent individual layers of composite material. Rather, they are symbolic of the approximate distribution of layers having given fiber directions.

As previously discussed, composite panels are constructed so that the direction of the primary axial load P that will be applied to the panel is substantially parallel with the stringers 36. In FIG. 8, the direction of the primary axial load P, is denoted by the arrow 70. As previously discussed, 0° layers have fiber orientations that lie parallel to the primary axial load direction, i.e., parallel to arrow 70. The central portion 50 of the composite panel is made up of multiple layers of composite material, herein called base layers 58. The base layers are substantially equally distributed numbers of +, and − layers with 0° and 90° layers interspersed as required for secondary loads. Sandwiched between the base layers are several stringer enhancement strips 60. The stringer enhancement strips 60 underlie the stringers 36 and extend outwardly from the stringers into the splice edge 48, terminating at the outermost edge of the splice edge. The stringer enhancement strips have a 0° fiber orientation. Because the stringer enhancement strips are sandwiched between the base layers 58, they create elongated plateaus 40 on which the stringers 36 are mounted.

In addition to the stringer enhancement strips 60, which run the entire length of the composite panel 46, additional reinforcing strips of 0° fiber orientation are located in the splice edge 48. These splice edge strips 61 are aligned with the stringers 36 and are gradually introduced into the tapered inner region 54 of the splice edge 48. In fact, it is this introduction that creates the taper. That is, the number of splice edge strips 61 are at a minimum near the central portion 50 of the composite panels and reach their greatest number where the tapered inner region 54 meets the outer region 56 of the splice edge 48. The gradual buildup of the splice edge strips 61 is in roughly inverse proportion to the reduction in the size of the stringers 36 whose cross section, as previously discussed, gradually reduces to the point of termination just short of the outer end of the inner region 54 of the splice edge section. The maximum number of splice edge strips 61 extend through the outer region 56 of the splice edge to the outermost edge of the panel 46.

As noted earlier, the outer region 56 of the splice edge is flat to facilitate secure fastening of two abutting panels using an uncomplicated splice 44. Obviously, the stringer enhancement strips 60 and the splice edge strips 61 increase the thickness of the overall panel in the region beneath the stringers 36, within the splice edge 48. In accordance with this invention, this thickness increase is compensated for by interspersing filler layers 65 within the base layers 58 in the areas of the panel part lying between the stringers in the splice edge. That is, the filler layers 65 are only included in the splice edge 48. They are not included in the remainder of the planar part 38 of the panel. As with the splice edge strips, the filler layers 65 are sandwiched among the base layers in the splice edge 48, increasing in number as the inner region 54 extends outwardly, and reaching a maximum where the outer region 56 of the splice edge 48 begins. Preferably, these filler layers have fiber directions varying between + and − in an approximately equal distribution.

In addition to the base layers 58, the stringer enhancement strips 60, the splice edge strips 61, and the filler layers 65, the splice edge 48 also includes additional filler layers 64. The additional filler layers are provided to further strengthen the outer region 56 of the splice edge 48 so that it can endure the bearing force created by the splice 44. The additional filler strips 64 are gradually interspersed in between the other layers in the splice edge 48, increasing in number as the splice edge progresses outwardly, reaching a maximum at the point where the outer region 56 begins. The fiber direction of the additional filler layers is approximately equally distributed between 0°, +, − and 90°.

FIGS. 9-12 are diagrams illustrating a layup formed in accordance with the invention, suitable for creating a composite panel of the type schematically shown in FIG. 8. In these FIGURES, 0° oriented layers are denoted "0," + oriented layers are denoted "+," − oriented layers are denoted "−" and 90° oriented layers are denoted "90."

Figure 9:
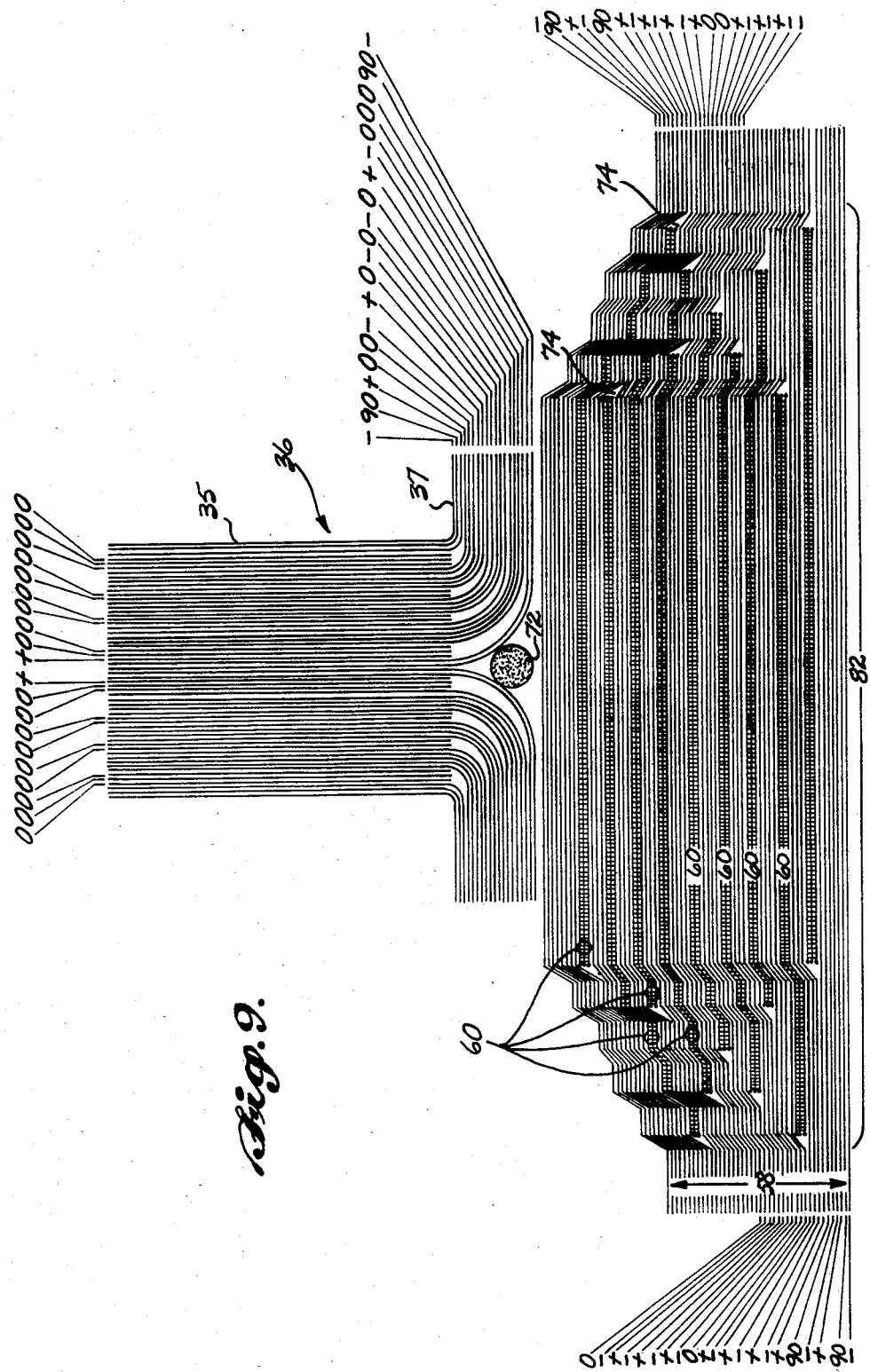
FIG. 9 is a diagrammatic cross-sectional view along line 9—9 of FIG. 8.

FIG. 9 is a cross-sectional view of a portion of the panel in the area of a stringer, i.e., along line 9—9 of FIG. 8. The upper part of FIG. 9 shows the layup of the stringers 36. As illustrated, the stringer has an inverted T shape, the web 35 of which is composed of mostly 0° layers. An opening created by the parting of the web layers that occurs when the flange 37 of the stringer is formed is filled with a core of fibrous material 72. Other smaller gaps between layers of fibrous material are filled, during curing, with the resin that holds the fiber layers together.

Figure 10:
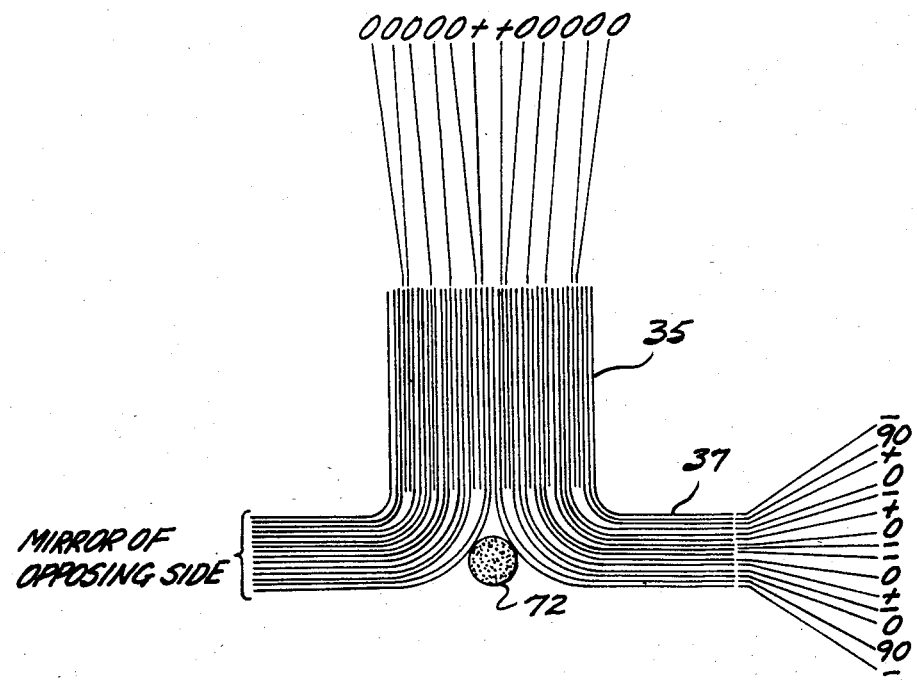
FIG. 10 is a diagrammatic cross-sectional view along line 10—10 of FIG. 8 showing a stringer element only.

As was pointed out earlier, the web 35 of the stringers 36 decreases in height as the stringers extend outwardly across the inner region 54 of the splice edge 48. A further gradual reduction in cross section of the stringer is accomplished by the gradual termination of approximately one-half of the 0° layers in the web 35 and flange 37 of the stringers 36. FIG. 10 shows the layup of the stringer 36 at its end 39. As shown, both the web 35 and flange 37 thicknesses have been decreased due to the elimination of approximately one-half of the 0° layers.

The lower portion of the diagram in FIG. 9 shows the layup of the central portion 50 of the composite panel lying beneath a stringer 36. Thus, this portion of FIG. 9 shows the distribution of stringer enhancement strips 60 between the base layers 58. As previously noted, the stringer enhancement strips 60 all have a 0° orientation. They are interspersed in groups of three strips throughout the thickness of the panel, as represented by the crosshatched portions 60. The direction of the various base layers 58 is indicated by the symbols in the margin of FIG. 9.

Mechanized fabrication of composite panels is enhanced by forming such panels of constant width strips of fibrous material. This provides cost effective fabrication of the panels by eliminating the need to adjust machinery as needed when variable width material is used. The invention takes advantage of this fabrication technique by making all of the stringer enhancement strips 60 that are interspersed throughout the base layers 58 of equal width. While of equal width, the groups of stringer enhancement strips 60 are staggered with respect to one another. This minimizes the vertical alignment of resin gaps 74 that occurs at the edges of the groups of stringer enhancement strips 60. Since resin gaps 74 have no structural fiber material (and hence have minimum load carrying capability), minimizing their vertical alignment reduces the possibility of a fracture along a line of such gaps.

Figure 11:
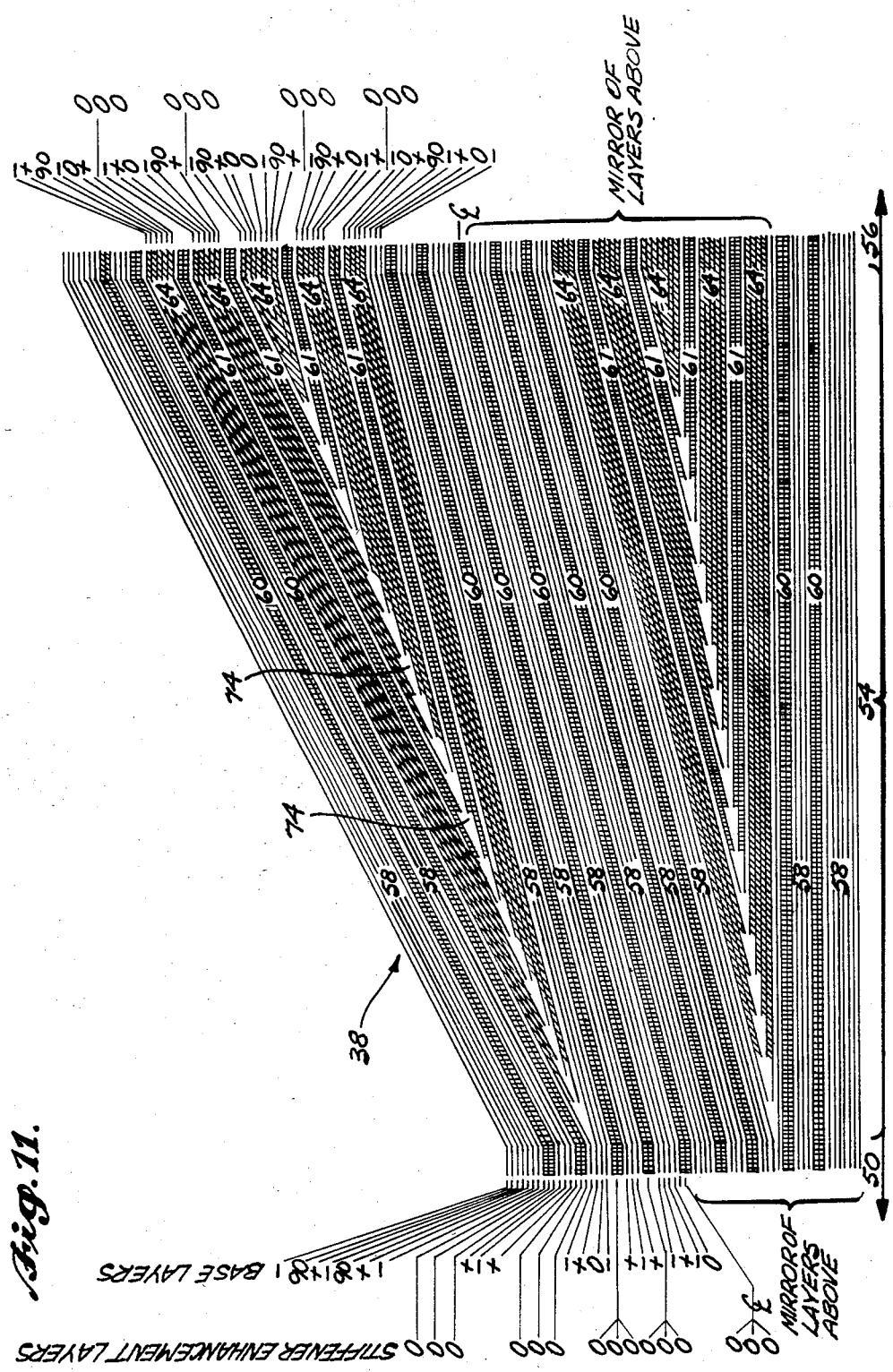
FIG. 11 is a diagrammatic cross-sectional view along line 11—11 of FIG. 8, showing the region beneath the stringer—excluding the stringer.
Figure 12:
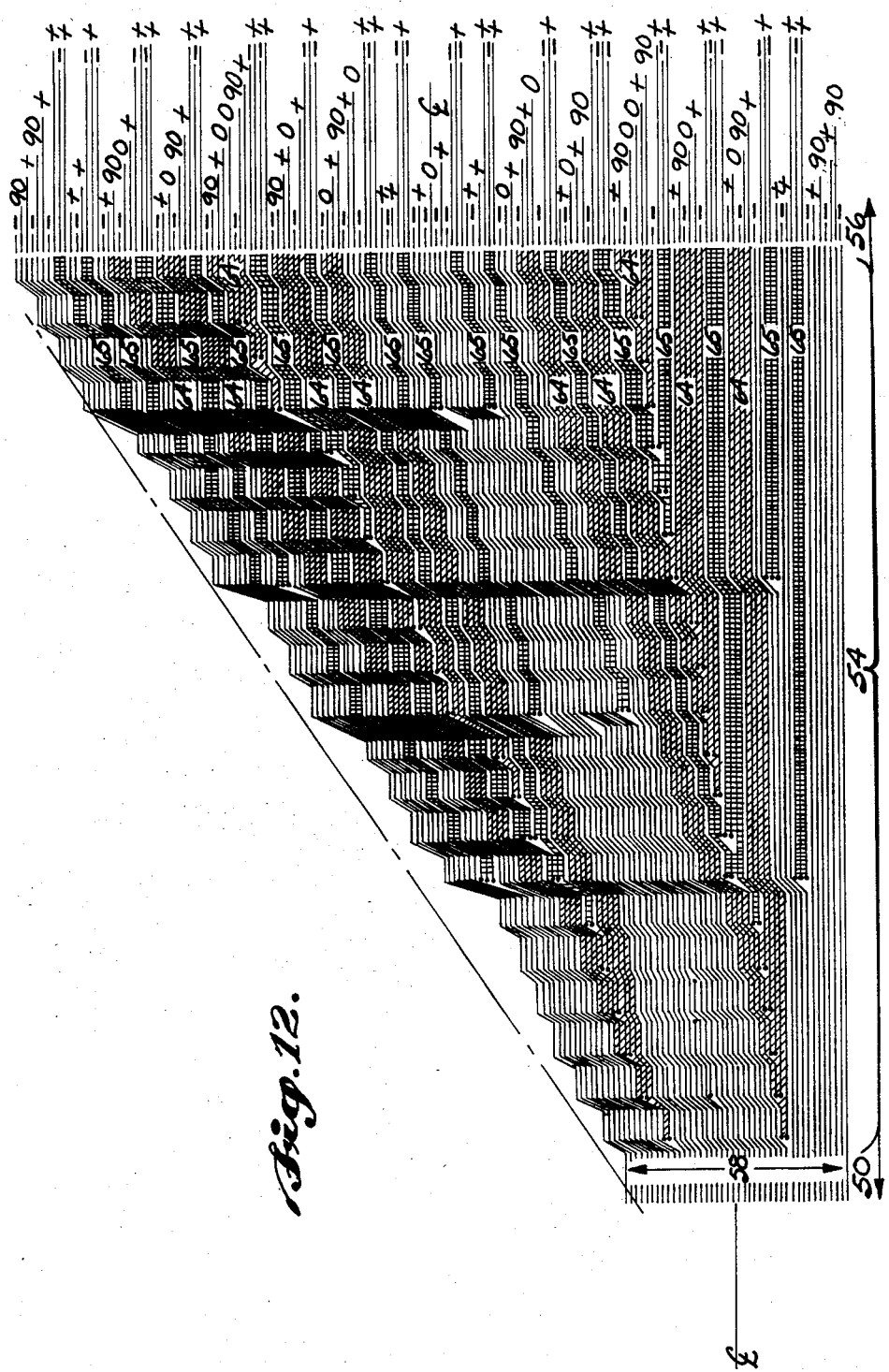
FIG. 12 is a diagrammatic cross-sectional view along line 12—12 of FIG. 8.

FIGS. 11 and 12 are cross-sectional layup diagrams that illustrate the position of the fibrous material layers in the splice edge region 48 along lines 11—11 and 12—12 of FIG. 8, respectively. The symbols in the margins of the FIGURES illustrate the fiber orientation of the various layers. FIG. 11 is a layup diagram of the inner part 54 of the splice edge 48 beneath a stringer 36 and FIG. 12 is a layup diagram of the inner part 54 of the splice edge 48 between the stringers 36. The stringer 36 is not shown in either figure.

Referring first to FIG. 11, as previously discussed, the overall thickness of panel member 38 increases across the length of the tapered inner region 54 of the splice edge 48 due to the gradual addition of splice edge strips 61 and additional filler layers 64 interspersed among the base layers 58 and stringer enhancement layers 60. As shown, the splice edge strips and additional filler layers are added in a symmetrical fashion about a central layer denoted by a centerline symbol. Crosshatching is used to distinguish the strips and layers added to base layers 58, which are not crosshatched. As previously noted, the fibers of the splice edge strips 61 have a 0° orientation, which adds additional primary load carrying capability to compensate for the reduced primary load bearing capacity caused by the reduction of the cross-sectional size of the stringers 36. As also previously noted, the additional filler layers 64 add to the shear and secondary load bearing capability throughout the splice edge 48 (secondary loading being that axial loading applied perpendicular to the direction of the primary load, P, for which the composite panel is designed). The additional filler layers 64 are also used to increase the thickness of the splice edge, so that the outer region 56 of the splice edge 48 can successfully carry the bearing pressure placed upon it by the splice 44.

Because the buildup of both the additional filler layers 64 and the splice edge strips 61 is gradual across the length of the inner region 54 of the splice edge 48, the size of resin gaps 74 in this region is minimized. Minimizing resin gap size minimizes the size of structurally weak points in the resultant panel.

The most significant difference between the layup beneath the stringers (i.e., containing the stringer enhancement strips 60 and the splice edge strips 61, FIG. 11), and the layup between the stringers (FIG. 12) is that the latter layup contains the filler layers 65 that are used to increase the thickness of the splice edge 48 to compensate for the lack of stringer enhancement strips 60 and splice edge strips 61.

FIGS. 9 through 12 show the precise number and orientation of layers in one actual embodiment of the invention. More specifically, the left side of FIG. 11 illustrates the layup of the central portion 50 of the discretely stiffened composite panel beneath a stringer 36. As previously discussed, this region includes stringer enhancement strips 60. The left margin symbols show forty-two (42) base layers 58 having nine (9) groups of three (3) 0° stringer enhancement strips 60 interspersed in the base layers. The stringer enhancement layers 60 are crosshatched for ease of identification. A total of twenty-four (24) splice edge strips 61 are gradually added across the length of the inner region 54 of the splice edge 48. The splice edge strips 61 are also crosshatched for ease of identification. A total of sixty (60) additional filler layers 64 are also gradually added to the inner region 54 of the splice edge 48. For ease of identification, the additional filler layers are also crosshatched in FIG. 11. The fiber orientation of the added strips and layers is noted by symbols located at the right margin of the drawing. The final thickness of the outer region 56 of the splice edge is one hundred and fifty-three (153) layers.

FIG. 12 shows forty-two (42) base layers 58 in the central portion 50 and no stringer enhancement strips 60 interspersed among the base layers. Two of the central portion base layers terminate just inside of the inner region 54 of the splice edge 48 with a single 0° layer added in their place. This minor adjustment to the layup is made to ensure that the outer region 56 of the splice edge 48 will have the same odd number of layers (e.g., 153)—built up symmetrically about a central layer—between the stringers as beneath the stringers.

The inner region 54 of the splice edge in the region between the stringers is gradually thickened by the sequential addition of fifty-two (52) filler layers 65, and sixty (60) additional filler layers 64. The orientation of these layers is shown by the symbols on the right side of FIG. 12.

It is to be understood that the precise numerical breakdown illustrated in FIGS. 9-12 is exemplary, since the invention lies not in an exact layer-by-layer construction. Rather, the invention resides in the inclusion of fiber layers and strips that both compensate for the strength lost by terminating stringers prior to the splice edge of a panel and provide a flat splice edge that can be joined to the splice edge of another panel (or some other item) by a relatively uncomplicated splice.

Figure 13:
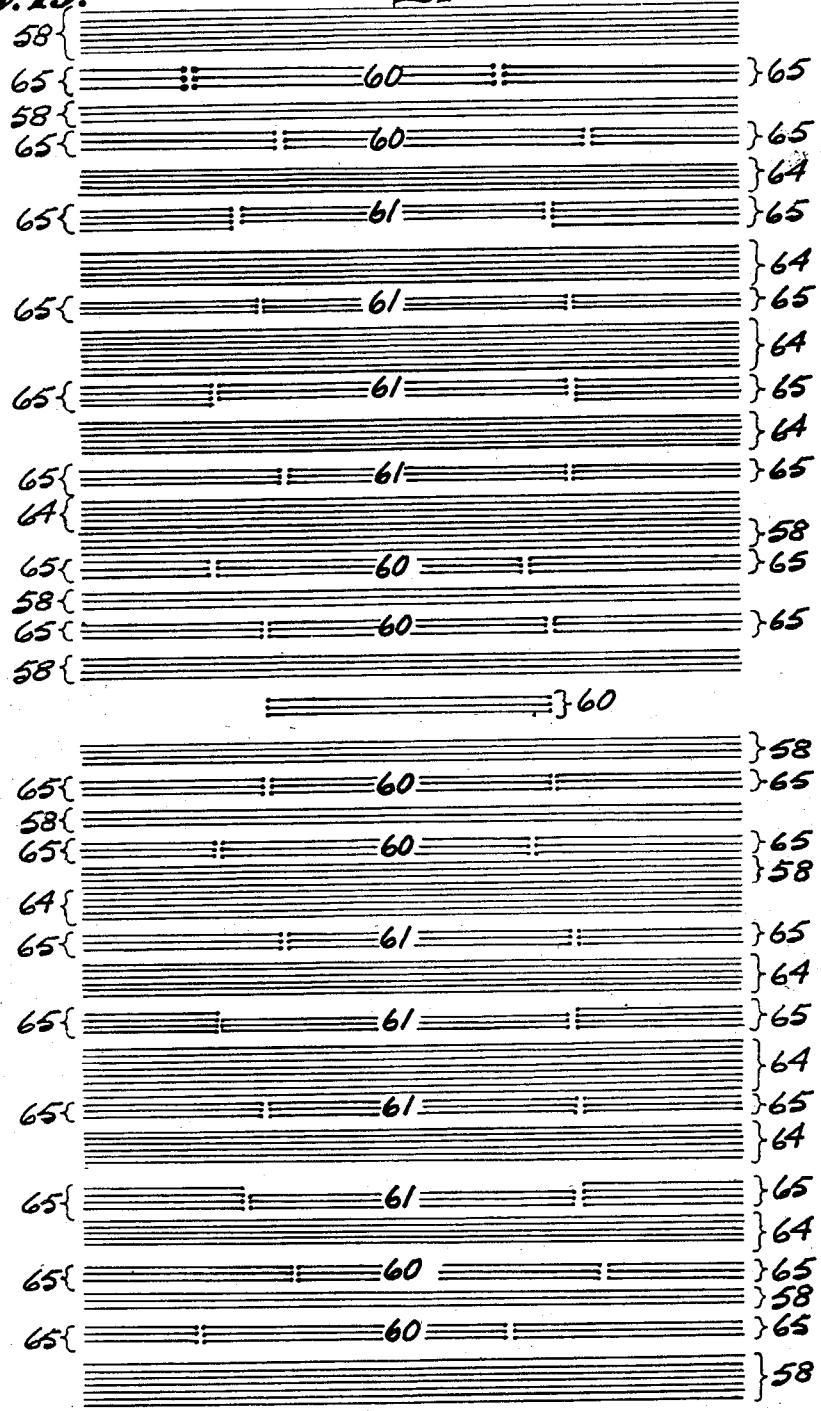
FIG. 13 is a diagrammatic end view along line 13—13 of FIG. 8.

FIG. 13 is an exploded layup diagram of the end section of the composite panel illustrated in FIG. 8 and is included to further illustrate the interrelationship between the edge splice composite layers containing the stringer enhancement strips 60 and the splice edge strips 61, and edge splice composite layers that do not include these strips.

As noted earlier, a composite panel that is built in accordance with the invention has splice edges that can be easily and quickly spliced to another panel or some other element. The unique layup of the composite layers forming the panel results in a panel in which discrete stiffness properties are maintained throughout the splice regions and any structural weaknesses due to resin gaps are minimized. Further, the addition of stringer enhancement strips, placed between layers of the skin material provide improved damage arrestment capability. Specifically, fractures travelling across the panel will be arrested at the areas of increased strength of the panel that are provided by the discrete groups of stringer enhancement strips.

While the present invention has been described in relation to a preferred embodiment, it is to be understood that various alterations, substitutions of equivalents and other changes can be made without departing from the spirit and scope of the invention.

The embodiments of the invention in which an exclusive property or privilege is claimed are as follows:

1. A discretely stiffened composite panel comprising:
   (a) a substantially planar part having a central portion and at least one edge, said edge having an inner region and an outer region, said planar part formed of base layers composed of multiple layers of fibrous material, said fibrous material formed of collimated fiber elements entrained within binder material, the longitudinal direction of said collimated fibers forming each layer having an orientation varying between perpendicular, parallel, and oblique with respect to said edge;
   (b) stringer enhancement strips formed of at least one layer of fibrous material, said fibrous material formed of collimated fiber elements entrained within a binder material, the longitudinal axis of said collimated fiber elements lying parallel to the longitudinal axis of said stringer enhancement strips, said stringer enhancement strips interspersed within said base layers and extending through said planar part, said stringer enhancement strips lying parallel to one another and substantially perpendicular to said edge of said substantially planar part;
   (c) filler layers composed of layers of fibrous material, said fibrous material formed of collimated fiber elements entrained within a binder material, said filler layers interspersed within said base layers proximal to said edge of said planar part, said filler layers located between said stringer enhancement strips, said filler layers distributed so that the thickness of said panel along said edge is substantially uniform; and
   (d) a plurality of elongate stringers composed of layers of fibrous material, said fibrous material formed of collimated fiber elements entrained within a binder material, said stringers attached to one side of said planar part in alignment with said stringer enhancement strips.

2. The panel of claim 1 further comprising:
splice edge strips formed of at least one layer of fibrous material, said fibrous material formed of collimated fiber elements entrained within a binder material, the longitudinal axis of said collimated fiber elements of said splice edge strips lying parallel to the longitudinal axis of said stringers and stringer enhancement strips, said splice edge strips interspersed within said base layers only in said edge of said panel, said splice edge strips located in substantial alignment with said stringer enhancement strips.

3. The panel of claim 2 wherein:
the cross-sectional area of the end portions of said stringers gradually reduces, reaching a minimum at the ends of said stringers;
the ends of said stringers lie in the inner region of said edge of said panel; and,
said splice edge strips and said filler layers being sized so that the inner region of said edge gradually increases in thickness as said cross-sectional areas of the end portions of said stringers gradually reduces.

4. The panel of claim 3 wherein said stringer enhancement strips, splice edge strips and filler layers each comprise a plurality of multiple layered groups, said multiple layered groups being interspersed in said base layers.

5. The panel of claim 4 wherein said multiple layered groups forming said stringer enhancement strips and said splice edge strips are staggered.

6. The panel of claim 5 wherein said multiple layered groups form said stringer enhancement layers and said splice edge strips are of equal width.

7. The panel of claim 6 wherein the number of layers forming each multiple layered group lies between three and five layers.

* * * * *